United States Patent [19]

Jakobsen

[11] Patent Number: 4,587,073
[45] Date of Patent: May 6, 1986

[54] METHOD OF MANUFACTURE OF A MULTILAYER CONTAINER OF PLASTIC MATERIAL

[75] Inventor: Kjell M. Jakobsen, Hjallese, Denmark

[73] Assignee: Platmanufaktur AB, Sweden

[21] Appl. No.: 606,286

[22] Filed: May 2, 1984

Related U.S. Application Data

[63] Continuation of Ser. No. 132,668, Mar. 21, 1980, abandoned, which is a continuation of Ser. No. 903,735, May 8, 1978, abandoned.

[30] Foreign Application Priority Data

May 13, 1977 [SE] Sweden ............................... 7705604

[51] Int. Cl.⁴ ............................................. B29C 45/14
[52] U.S. Cl. ................................... 264/515; 264/322; 264/296
[58] Field of Search ............... 215/1 C; 264/514, 515, 264/516, 296, 322, 248, DIG. 69; 425/521, 519, 516, 113

[56] References Cited

U.S. PATENT DOCUMENTS 3,561,629 2/1971 Turner ................................. 215/1 C
3,955,697 5/1976 Valyi ................................... 215/1 C

*Primary Examiner*—John E. Kittle
*Assistant Examiner*—Thomas C. Saitta
*Attorney, Agent, or Firm*—Roberts Spiecens Cohen

[57] ABSTRACT

A method of producing a container of plastic material from a blank comprising a plurality of layers in tubular form in which the inner layer consists of new material and the adjacent layer consists of previously used plastic material which has been recycled for re-use. One end of the blank is created and closed on a bowl-shaped support and thereat the inner layer penetrates to the outer surface of the blank to form a region which consists completely of new and not previously used material. The blank is then blow-molded to form the container.

12 Claims, 7 Drawing Figures

METHOD OF MANUFACTURE OF A MULTILAYER CONTAINER OF PLASTIC MATERIAL

This application is a continuation of application Ser. No. 132,668, filed 3/21/80 which in turn is a continuation of Ser. No. 903,735 filed May 8, 1978 both now abandoned.

FIELD OF THE INVENTION

The present invention relates to a blank for a laminated container of plastic material and to a laminated container of plastic material made from the blank, wherein an inner wall layer of the container consists of new plastic material and the container also has a wall layer consisting of plastic material which has been used previously and has been recycled for re-use. With containers made in this way it is always possible to re-use plastic material without any impurities in the re-used plastic material coming into contact with the goods kept in the containers or with goods surrounding the containers.

PRIOR ART

In recent times a number of packings or containers made of plastic material have been produced. There is a great interest in using such containers for storing foodstuffs or other products for which there are stringent requirements in respect of the purity of the containers. The reason for the interest in containers of plastic material is to be seen in that they can be made substantially lighter than containers of sheet metal or glass. In comparison with containers of glass, the container of plastic also has higher impact strength.

Plastic materials which are used at the present time for this purpose comprise predominantly polyvinyl chloride (PVC), acrylonitrile (AN), and polyethylene terephthalate (PET) and also similar materials. The reason for this is that the materials mentioned suitably combine sealing properties, strength properties, and price and also comply with requirements imposed in respect of cleanliness, for example, in the foodstuffs industry.

In the course of time the interest in, re-use of different types of material has increased. For containers which are intended for the purposes mentioned above there are certain doubts regarding the suitability of using recycled materials. This is due to the fact that recycled plastic materials always contain a larger or smaller amount of impurities which cannot be regarded as suitable for coming into contact with, for example, liquids with which the containers are to be filled. These doubts are also not overcome when the containers used are subjected to very careful inspection, sorting, and cleaning before recycling. It is indisputable that by various methods, for example by processing with new, fresh material the concentration of impurities and consequently the degree of impurity can be kept so low that from a practical point of view the action of the impurities can be ignored. This means that, for example, the degree of impurity can be kept within limits permissible in accordance with the valid regulations in the country in question. Human nature is however such that many potential users of packings containing recycled plastic materials cannot accept even a very low degree of impurity. This negative reaction is usually due simply to ethical reasons or a matter of feeling.

SUMMARY OF THE INVENTION

The present invention seeks to produce a blank for a container and a container which is made from the blank, in which the disadvantages described above are overcome and recycled plastic material is contained in the wall of the container.

According to the invention, a blank consisting of a number of superimposed layers of plastic material is produced, the blank preferably being tubular in shape. This blank (the semi-finished product) is then converted in a second stage, into a container. That layer in the blank which in the shaped container will then come into contact with the contents of the container is made of new material, that is to say material not previously used. The remaining layer or layers are made of material which had previously been used, that is to say had been part of a container and was recycled for re-use. The two layers are joined together in such a manner that the blank and the container formed from the blank correspond in respect of strength to a blank or container made of homogeneous plastic material. The two layers are joined together in such a manner that for the production of the container it is possible to work by a known technique, mainly in accordance with production methods normally employed for containers made of homogeneous material.

A blank according to the invention is preferably made by co-extrusion. In accordance with the principle of the invention, transfer moulding of the layers on a mandrel is also possible, the mandrel carrying the inner layer of, for example, a tubular blank. In the case of co-extrusion, it may be expedient, for example to extrude continuously a tube which is thereupon cut into pieces of a suitable length. These pieces of tubing are then closed at one end, while at the same time being shaped at their other end in order to permit their fastening in a forming apparatus. In the forming apparatus the blanks are converted into finished containers.

In the closing of each individual blank, the latter is fastened over a mandrel and a holding-up means is brought towards to the latter. At least that part of the blank which is to be closed is heated before and/or after being placed on the mandrel. The holding-up means and the mandrel then close the blank and the latter thus assumes the desired rounded final shape. During the closing of the blank, the inner layer is brought together in such a manner that in the closed portion of the blank it forms a continuous inner surface. This is achieved in that the holding-up means is bowl-shaped and acts on the inner layer in such a manner that in the closed portion of the blank, the inner layer forms a more or less homogeneous layer of material which extends from the inner surface of the blank to its outer surface. In the normal case, the inner layer thus forms a layer of material which extends to the outer surface of the blank in a region around the longitudinal axis of the latter.

The invention also includes the possibility of making the blank and consequently also the container of more than two layers. This construction may be necessary when it is desired to utilize recycled material also in those cases where the previously mentioned stringent hygenic requirements in respect of the container are extended so as to apply also to contact between the outer surface of the container and the medium lying outside the container. Recycled plastic material may, in such cases, be contained in the layer or layers lying between the inner and outer layers of the container wall.

A blank arranged in accordance with the alternatives described above is clamped in a blow moulding arrangement and is connected in the latter in known manner into a finished container. In the finished container, the internal space is always bounded by the inner layer which consists of new material and not of recycled material obtained, for example, from a previously used container.

According to the principle of the invention, the two layers may also consist of different plastic materials which at the junction between the plastic materials provide the bond which is necessary as previously mentioned. This construction of the container may be desirable, for example, in order to comply with special strength requirements in respect of ability to withstand high internal pressure or external impacts and shocks. A container constructed in this manner may, for example, be used for storing refreshment drinks containing carbon dioxide.

With regard to the thickness of the layers in the blanks and in the containers it is necessary, as is also the case with containers made of homogeneous plastic materials, that the thickness should be selected having regard to the mechanical stresses which the containers may be expected to undergo. In addition, requirements in respect of the ability to prevent perforation by surrounding substances and also penetration from inside and outside must obviously also determine the wall thickness. This ability is decisive for the maximum permissible storage life for products, for example, liquid, in the containers.

BRIEF DESCRIPTION OF THE DRAWINGS

The invention is described more fully below in connection with the accompanying drawings, in which:

FIG. 6 shows a second stage in the closing of the blank.

DETAILED DESCRIPTION

Figure 1:
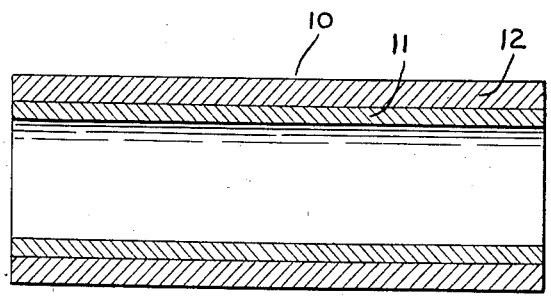
FIG. 1 is a longitudinal section through a tubular blank before the closing of the latter.
Figure 2:
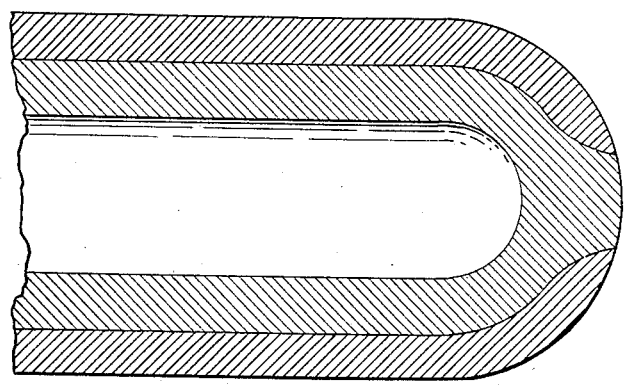
FIG. 2 shows a detail of a closed end of a blank.
Figure 3:
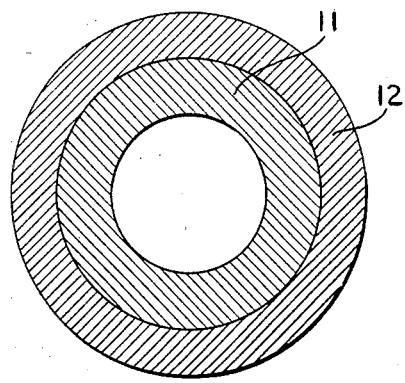
FIG. 3 is a cross-section through a tubular blank, FIG. 4 an elevation of a bottle-like container in section.
Figure 4:
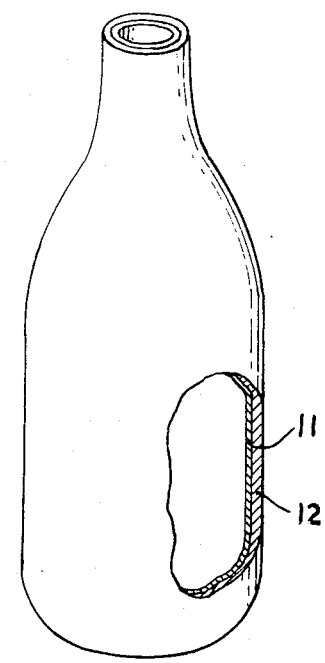

In FIGS. 1 to 3 a tubular blank 10 is shown. The blank is composed of an inner layer 11 and an outer layer 12. The inner layer preferably consists of new material and the outer layer of recycled material. In FIG. 1 the blank is open at both ends. FIG. 2 shows in detail how the inner layer of the blank has pushed aside the outer layer during the closing of the blank, so that in the central portions of the closed end the inner layer forms a layer of homogeneous plastic material which extends from the inner surface of the blank to the outer surface of the latter. From FIG. 2 it can be seen that it is possible during the closing of the blank to displace the material in the inner layer in such a manner that the outer layer of recycled material is completely prevented from coming into contact with the interior of the blank.

Figures 5, 6, 7:
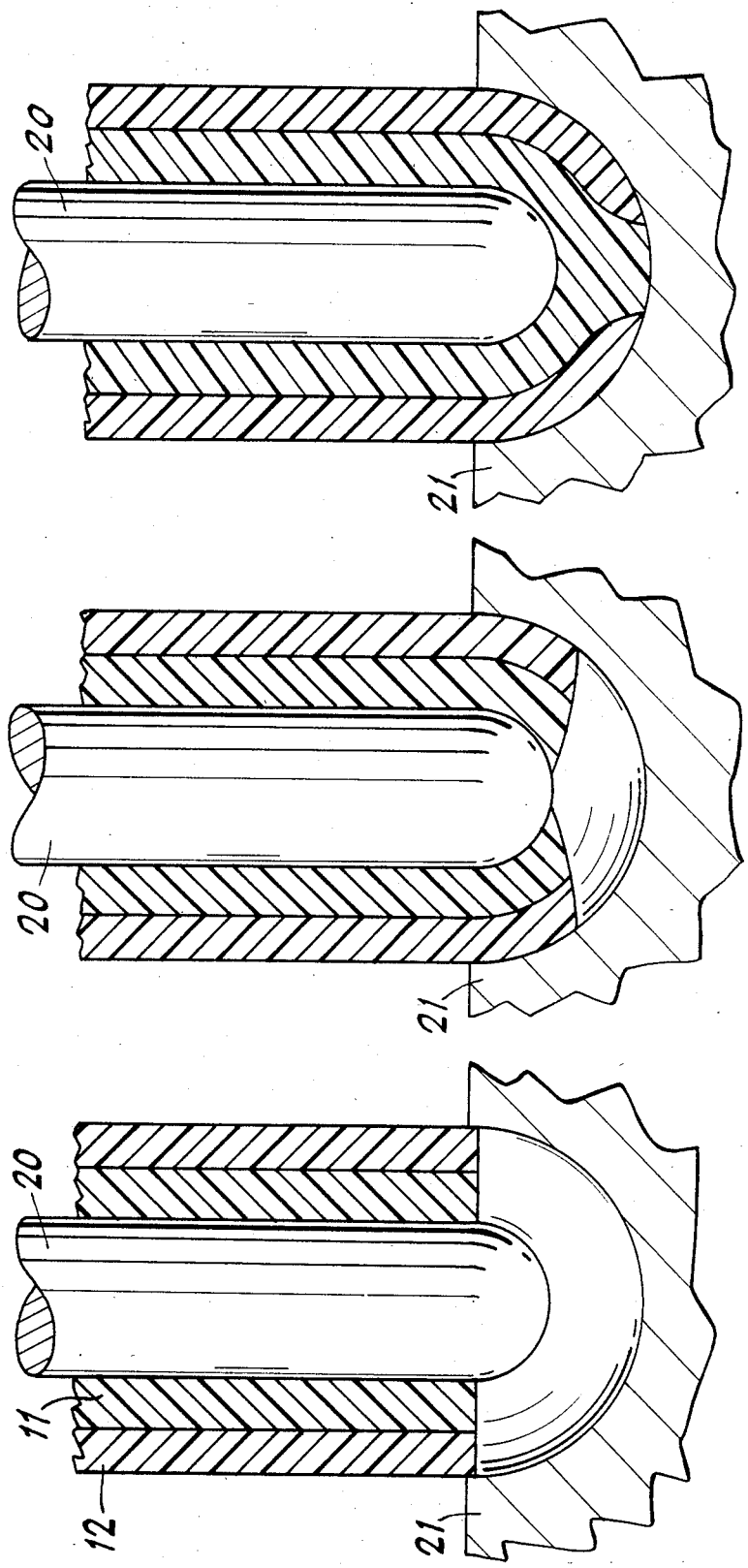
FIG. 6 is a diagrammatic illustration of a first stage in the closing of the end of the tubular blank.
FIG. 7 shows the final stage in the closing of the blank.

FIGS. 5-7 show the stages of the closing of the blank. As seen in FIG. 5, the blank is placed on a mandrel 20 and a bowl-shaped holding-up means 21 is brought into facing relation with the blank and mandrel. The end portion of the blank which is closed is heated before and/or after being placed on the mandrel. The holding-up means and the mandrel 20 then cooperate to close the blank and form the desired rounded final shape of the closed end. During the closing of the blank the open end of the inner layer 11 is brought together, such that in the closed portion of the blank, it forms the continuous inner surface. This is achieved by the bowl shape of the holding-up means which acts on the blank such that the inner layer forms a more or less homogeneous layer of material which extends from the inner surface of the blank to its outer surface in a region around the longitudinal axis of the blank. In the course of the closure of the blank, the material in the inner layer prevents the outer layer from closing and from coming into contact with the interior of the blank.

The thickness of the layers of material in the blank is determined by the necessary thickness of material of the finished container. For this purpose, the wall thickness is determined by the mechanical stresses that can be expected for the container and the requirements imposed in respect of its ability to withstand penetration of its walls. This ability to withstand penetration relates both to penetration of impurities from the layer composed of recycled plastic material into the contents of the container or to the outer surface of the container and to the penetration of undesirable substances from the surrounding atmosphere into the contents of the container, as well as to the penetration of substances in the opposite direction. With the thicknesses of material normally used in the finished containers, for a blank composed of two layers, the outer layer 12 of recycled material will, for example amount to about 50 to 80%, preferably from 60 to 70% of the total wall thickness.

A container according to the invention may be in the form of a barrel, a canister, a bottle, a can or the like. In cases where layers of material in the container wall consist of plastic material of the same chemical composition, it may be permissible for the layers of plastic material to be joined together so firmly that for the purposes of recovery of material from the container walls they cannot be separated from one another.

In cases where recovery of material from the container walls is desired and where this wall consists of plastic materials of different chemical compositions, it is necessary for the bond between the layers of material to make it possible for the layers to be freed from one another for the purpose of recovery. This can be achieved in that one of the layers, preferably the outer layer, is made of a plastic material which breaks up into smaller segments or fragments of material when, for example, a container is compressed by passing it between two rollers.

I claim:

1. A method of producing a container of plastic material comprising forming a blank of a composite material of a plurality of layers in tubular form, said layers including an inner layer and at least one outer layer, said inner layer in the composite material being different from said at least one outer layer, said blank having one end which is initially tubular and open, closing said open end of the blank by the steps comprising heating said open end, and contacting said one end of the blank with a bowl-shaped holding means to close said blank by causing the open end of the inner layer to come together and penetrate through said at least one outer layer to the outer surface of the container to prevent closure of said outer layer and form an integrated region which consists completely of said material of said inner layer and which isolates the interior of the blank from said at least one outer layer, said inner layer being of a thickness of 20 to 50% of the total wall thickness of the blank outside said integrated region and blow molding said blank to form the container, the bottom of which includes said integrated region which consists of said material of said inner layer which not only isolates the interior of the blank from said at least one outer layer but also the outer central bottom surface of the container from said at least one outer layer.

2. A method according to claim 1 wherein the materials in said layers are of the same chemical composition.

3. A method according to claim 1 wherein said inner layer constitutes 30 to 40% of the total wall thickness of the blank.

4. A method according to claim 1 wherein said inner layer consists of polyethylene terephthalate.

5. A method according to claim 1 wherein said inner layer has a thickness in the region where it penetrates through said at least one outer layer which is greater than the thickness of said at least one outer layer.

6. A method according to claim 1 wherein said material of said inner layer consists of new material and said at least one outer layer consists of previously used plastic material which has been recycled for re-use.

7. A method according to claim 1 wherein said outer surface of the container is smooth and continuous in said integrated region, the outer surface of said at least one outer layer merging smoothly with the outer surface of the inner layer in said integrated region.

8. A method according to claim 1 comprising forming said layers by coextrusion with said layers both extending to said one end of the blank.

9. A method as claimed in claim 1 comprising mounting the tubular blank on a mandrel and relatively moving the mandrel and the bowl-shaped holding means towards one another for closing said open end.

10. A method as claimed in claim 1 wherein the closed end of the blank is rounded.

11. A method according to claim 1 wherein the material in one of said layers has a different chemical composition from that of the remaining layer.

12. A method acccording to claim 11 wherein the layers of material of different chemical composition are loosely bonded to facilitate separation upon recycling.

* * * * *